(12) United States Patent
Lu

(10) Patent No.: US 12,533,734 B2
(45) Date of Patent: Jan. 27, 2026

(54) ELECTRIC DRILL

(71) Applicant: Mechtron (Shanghai) Intelligent Technology Co., Ltd., Shanghai (CN)

(72) Inventor: Guanxiong Lu, Shanghai (CN)

(73) Assignee: Mechtron (Shanghai) Intelligent Technology Co., Ltd., Shanghai (CN)

( * ) Notice: Subject to any disclaimer, the term of this patent is extended or adjusted under 35 U.S.C. 154(b) by 0 days.

(21) Appl. No.: 19/172,806

(22) Filed: Apr. 8, 2025

(65) Prior Publication Data

US 2025/0319527 A1 Oct. 16, 2025

(30) Foreign Application Priority Data

Apr. 11, 2024 (CN) .......................... 202420764353.8

(51) Int. Cl.
*B23B 45/02* (2006.01)
*B25B 21/00* (2006.01)
*B25F 5/02* (2006.01)

(52) U.S. Cl.
CPC ............ *B23B 45/02* (2013.01); *B25B 21/007* (2013.01); *B25F 5/02* (2013.01)

(58) Field of Classification Search
CPC ... B23B 31/1071; B23B 45/005; B23B 45/02; B25B 13/06; B25B 13/20; B25B 13/34; B25B 13/44; B25B 13/48; B25B 21/00; B25B 21/001; B25B 21/002; B25B 21/02; B25B 21/026; B25B 23/0007; B25B 23/0035; B25B 23/0057; B25B 23/0064; B25B 23/08; B25B 23/10; B25B 23/147; B25B 23/16; B25B 21/007; B25F 5/00; B25F 5/02; B23P 19/02; B23P 19/04; B23P 19/06

See application file for complete search history.

(56) References Cited

U.S. PATENT DOCUMENTS

| | | | |
|---|---|---|---|
| 8,800,999 B2 * | 8/2014 | Puzio | B25B 23/0035 |
| | | | 279/75 |
| 2017/0028543 A1 * | 2/2017 | Chen | B25B 21/007 |
| 2021/0162575 A1 * | 6/2021 | Kneer | H01R 11/12 |
| 2024/0075609 A1 * | 3/2024 | Zhao | B25F 5/02 |
| 2025/0073866 A1 * | 3/2025 | Tomayko | B25F 5/001 |

* cited by examiner

*Primary Examiner* — Robert J Scruggs
(74) *Attorney, Agent, or Firm* — Zhigang Ma

(57) ABSTRACT

Provided is an electric drill, which includes a housing. The housing is provided with a motor, a drill bit quick connector and a battery module therein. One end of the drill bit quick connector is drivingly connected to an output end of the motor, and the other end is used for detachable connection with an external drill bit. The battery module is detachably assembled in the housing and configured to supply power to the motor. The drill bit quick connector is configured to lock the external drill bit in a docking state, and a trigger component is provided on the housing and configured to release a locked state between the drill bit quick connector and the external drill bit. Quick-change of the drill bit is achieved by arranging the trigger component, making the electric drill convenient for non-professional users to operate.

5 Claims, 3 Drawing Sheets

ELECTRIC DRILL

CROSS-REFERENCE TO RELATED APPLICATION

This application claims priority to Chinese Patent Application No. 2024207643538, filed Apr. 11, 2024, which is herein incorporated by reference in its entirety.

TECHNICAL FIELD

The disclosure relates to the field of electric drill, and more particularly to an electric drill.

BACKGROUND

An electric drill is a regular product among power tools and is also a power tool product with a largest demand. A working principle of the electric drill is that a rotor of a small-capacity electromagnetic rotary or electromagnetic reciprocating motor rotates and cuts a magnetic field. By a transmission mechanism driving a working device, gears are driven to increase a power of a drill bit, enabling the drill bit to scrape surfaces of objects and penetrate them more effectively.

However, a drill bit of an available electric drill is inconvenient to assemble and disassemble during use, which greatly affects a speed of bit replacement and further reduces work efficiency. In addition, a connection structure of the available electric drill is mostly exposed outside a housing, which is easy to cause accidents due to accidental contact. Additionally, a structure of the available electric drill is complex, making the available electric drill difficult for non-professionals to operate, thereby limiting a scope of application thereof.

Therefore, regard of the deficiencies in the related art, it is necessary to design an electric drill to solve the aforementioned problems.

SUMMARY

To overcome the deficiencies of the aforementioned related technology, the disclosure aims to provide an electric drill.

To achieve aforementioned objectives and other related objectives, a technology solution provided in the disclosure is an electronic drill. The electronic drill includes a housing; and the housing is provided with a motor, a drill bit quick connector and a battery module therein. An end of the drill bit quick connector is drivingly connected to an output end of the motor, and another end of the drill bit quick connector is configured for detachable connection with an external drill bit. The battery module is detachably assembled in the housing and is configured to supply power to the motor. The drill bit quick connector is configured to lock the external drill bit in a docking state, and a trigger component is provided on the housing and configured to release a locked state between the drill bit quick connector and the external drill bit.

In an embodiment, the housing is constituted as a gun-shaped structure. The motor and the drill bit quick connector are disposed in a barrel of the housing. An opening is provided at a muzzle of the housing. The another end of the drill bit quick connector facing away from the motor is disposed in the opening; and the battery module is detachably inserted into a grip of the housing.

In an embodiment, the drill bit quick connector includes a connecting tube, a sleeve, a steel ball and a first spring. An end of the connecting tube is drivingly connected to the output end of the motor, another end of the connecting tube is disposed in the opening and defines a slot therein, the slot is configured for receiving an insertion end of the external drill bit. The sleeve is sleeved outside the connecting tube and disposed to correspond to the slot. An annular cavity is defined between the connecting tube and the sleeve; the first spring is sleeved on the connecting tube and located in the annular cavity, an end of the first spring is disposed to abut against a retaining ring, the retaining ring is disposed on the connecting tube, another end of the first spring is disposed to abut against a stepped surface formed inside the sleeve. The connecting tube is provided with a conical hole. The conical hole is disposed to correspond to the slot, and is connected with the slot. The steel ball is disposed in the conical hole and partially protrudes from an inner wall of the slot, and an annular protrusion is provided on an inner side of the sleeve and corresponds to the conical hole.

In an embodiment, the trigger component includes a sliding seat and a second spring. The sliding seat is slidably disposed on the housing along an axial direction of the connecting tube. A positioning fork is disposed on the sliding seat. An annular groove is defined on an outer side of the sleeve, the positioning fork is inserted into the annular groove. The second spring is disposed along the axial direction of the connecting tube; an end of the second spring abuts against the housing; and another end of the second spring abuts against the sliding seat.

In an embodiment, a bearing is provided in the housing, an outer race of the bearing is fixedly connected to the housing, and an inner race of the bearing is fixedly connected to an outer periphery of the connecting tube.

In an embodiment, a controller is disposed in the housing, a switch button is disposed on the grip of the housing, the switch button is connected to the controller, and the controller is connected to the motor and the battery module.

In an embodiment, a battery slot is disposed in the grip of the housing, the battery module is detachably inserted into the battery slot, the housing is provided with a snap-lock structure, and the snap-lock structure is configured to lock or unlock the battery module.

By applying aforementioned technical solutions, the disclosure has the following beneficial effects.

The electric drill provided by the disclosure breaks the traditional appearance of electric drills in terms of aesthetics, featuring a futuristic and intelligent design. By using the housing to hide exposed rotating components in the related art, it reduces the possibility of long hair getting caught, or reduces the risk of accidental finger contact. Finally, quick-change of the drill bit is achieved by arranging the trigger component, making the electric drill convenient for non-professional users to operate and having a wide scope of applications.

DETAILED DESCRIPTION OF EMBODIMENTS

Figure 1:
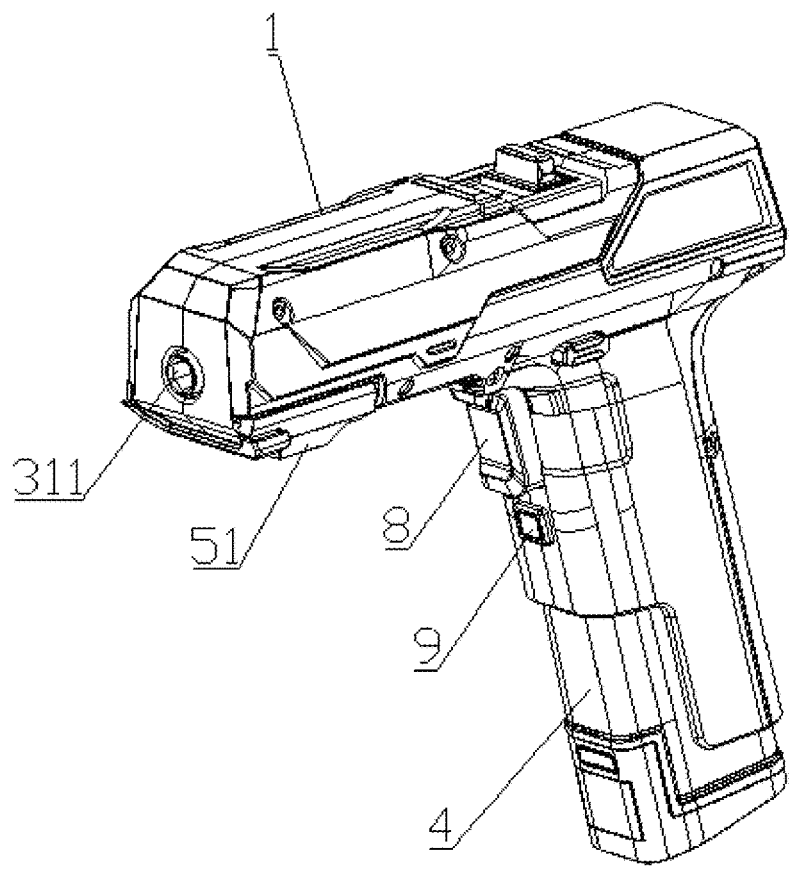
FIG. 1 illustrates a schematic structural diagram of an electric drill according to the disclosure.
Figure 2:
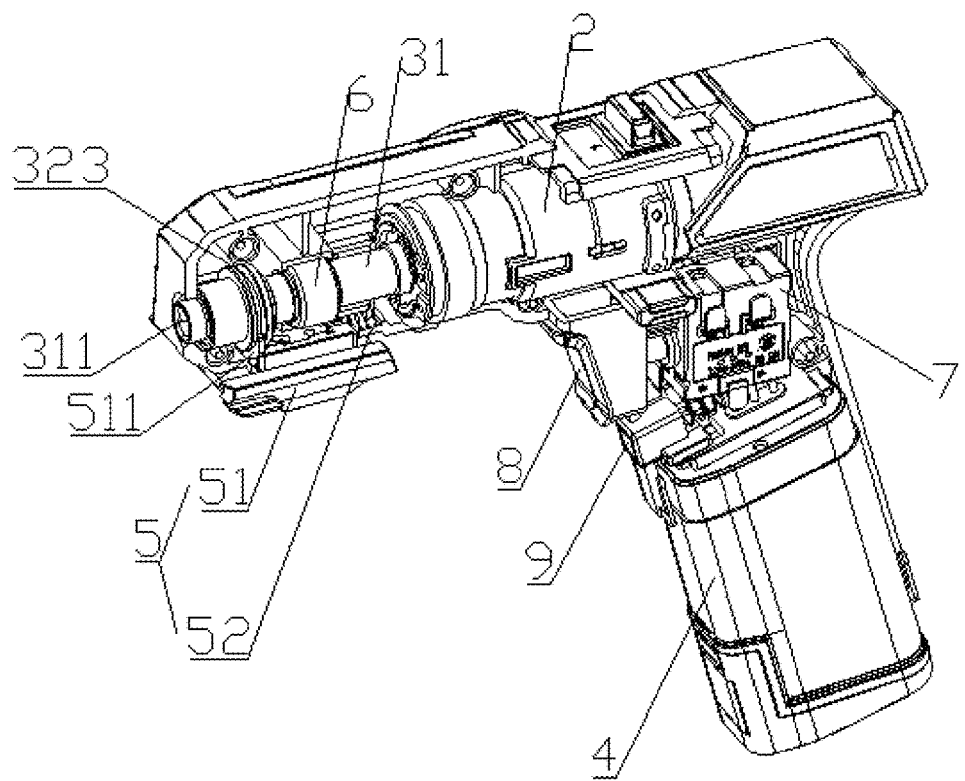
FIG. 2 illustrates an internal schematic structural diagram of the electric drill according to the disclosure.
Figure 3:
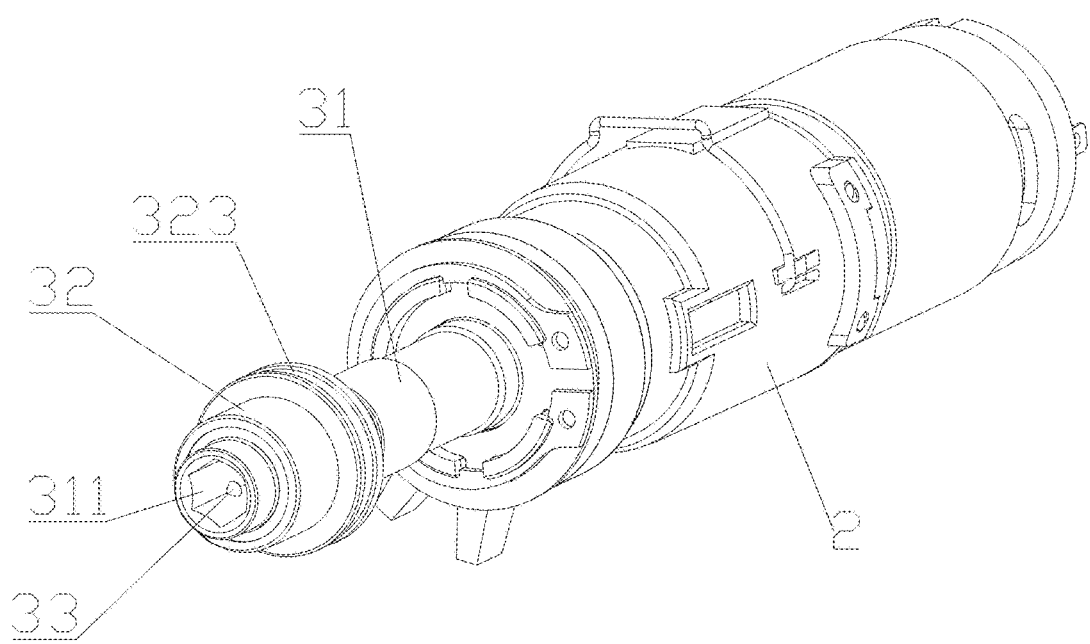
FIG. 3 illustrates an assembly schematic diagram of a motor and a drill bit quick connector according to the disclosure.
Figure 4:
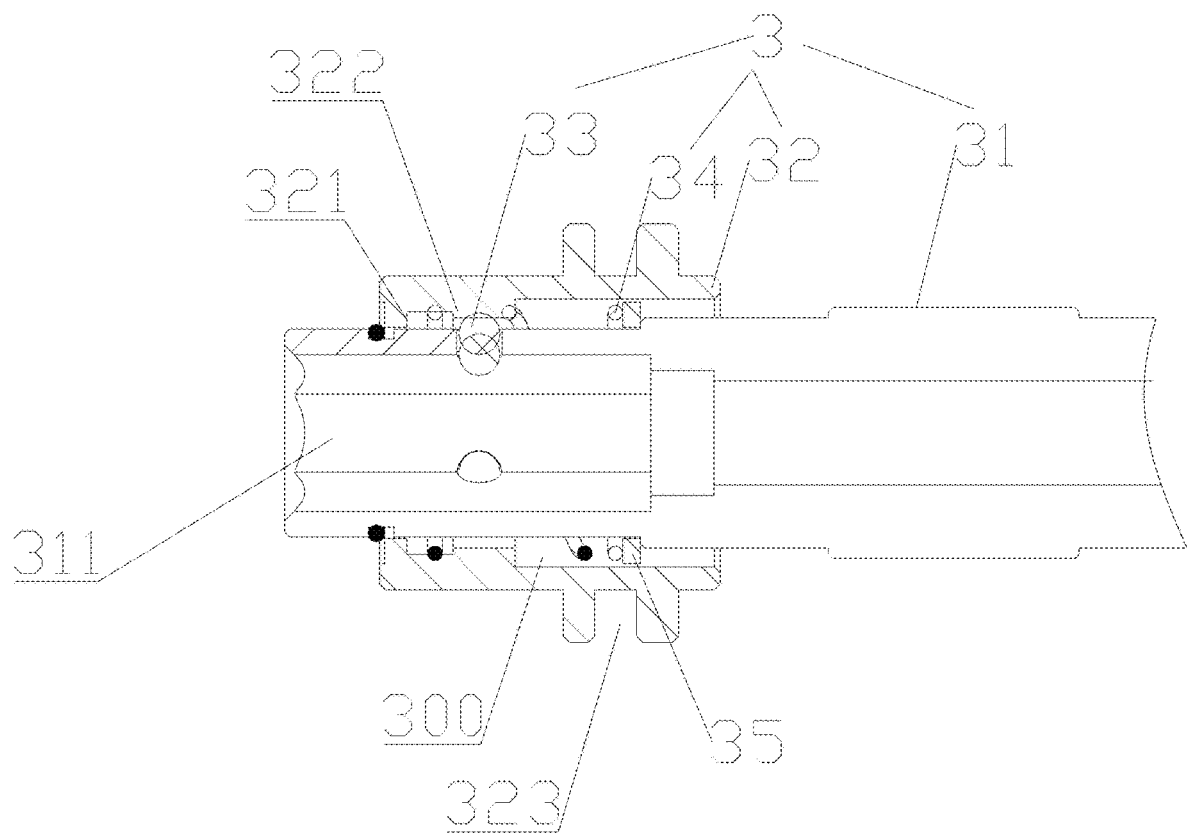
FIG. 4 illustrates a sectional view of a part of the drill bit quick connector according to the disclosure.

The implementation of the disclosure is described below through specific embodiments, and those skilled in the art can easily understand other advantages and effects of the disclosure from the contents disclosed in this specification. Please refer to FIG. 1 through FIG. 4. It should be noted that, in the description of the disclosure, orientations or positional relationships indicated by terms "center", "upper", "lower", "left", "right", "vertical", "horizontal", "inner", "outer", are based on the orientations or positional relationships illustrated in attached drawings, or the orientations or positional relationships that the disclosure is usually placed during use. These terms are intended only to facilitate the description of the disclosure and to simplify the description, and are not intended to indicate or imply that the device or components referred to must have a specific orientation, be constructed and operated in a specific orientation. Therefore, these terms should not be construed as limitations to the disclosure. In addition, terms such as "first", "second", and "third" are only used for distinguishing descriptions and should not be understood as indicating or implying relative importance. The terms "horizontal", "vertical", and "overhanging" do not require the components to be absolutely horizontal or overhanging, but may be slightly inclined. For example, "horizontal" only means that its direction is more horizontal compared to "vertical", rather than indicating that a structure must be completely horizontal; it can be slightly inclined.

In the description of the disclosure, it should further be noted that, unless otherwise clearly specified and limited, the terms "dispose", "install", "connect" and "link" should be understood in a broad sense. For example, it can be a fixed connection, a detachable connection, an integral connection, a mechanical connection, an electrical connection, a direct connection, an indirect connection through an intermediate medium, or an internal connection between two components. For those skilled in the art, the specific meanings of the above terms in the disclosure can be understood according to specific situations.

Embodiment 1

Figure 5:
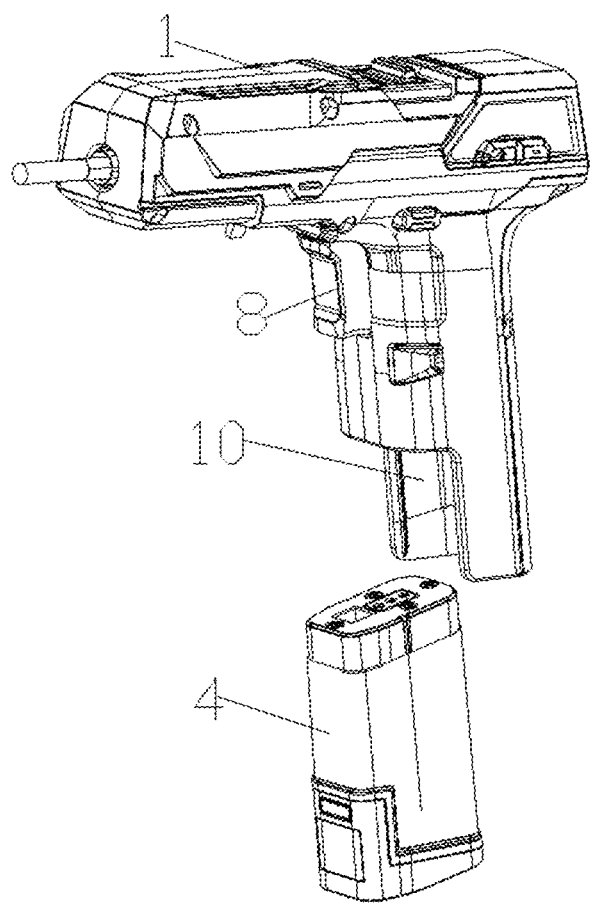
FIG. 5 illustrates a schematic structural diagram of the electric drill with a battery module being disassembled according to the disclosure.

As illustrated in FIG. 1 through FIG. 5, an electric drill is provided according to an overall technical concept of the disclosure. The electric drill includes a housing 1. The housing 1 is provided with a motor 2, a drill bit quick connector 3 and a battery module 4 therein. An end of the drill bit quick connector 3 is drivingly connected to an output end of the motor 2, and another end of the drill bit quick connector 3 is configured for detachable connection with an external drill bit (not shown). The battery module 4 is detachably assembled in the housing 1 and is configured to supply power to the motor 2. The drill bit quick connector 3 is configured to lock the external drill bit in a docking state, and a trigger component 5 is provided on the housing 1 and configured to release a locked state between the drill bit quick connector 3 and the external drill bit.

As illustrated in FIG. 1 through FIG. 5, in an embodiment, the housing 1 is constituted as a gun-shaped structure. The motor 2 and the drill bit quick connector 3 are disposed in a barrel of the housing 1. An opening is provided at a muzzle of the housing 1. The another end of the drill bit quick connector 3 facing away from the motor 2 is disposed in the opening; and the battery module 4 is detachably inserted into a grip of the housing 1.

As illustrated in FIG. 1 through FIG. 5, in an embodiment, the drill bit quick connector 3 includes a connecting tube 31, a sleeve 32, a steel ball 33 and a first spring 34. An end of the connecting tube 31 is drivingly connected to the output end of the motor 2, another end of the connecting tube 31 is disposed in the opening and defines a slot 311 therein. The slot 311 is configured for receiving an insertion end of the external drill bit. The sleeve 32 is sleeved outside the connecting tube 31 and disposed to correspond to the slot 311. An annular cavity 300 is defined between the connecting tube 31 and the sleeve 32. The first spring 34 is sleeved on the connecting tube 31 and located in the annular cavity 300. An end of the first spring 34 is disposed to abut against a retaining ring 35, the retaining ring 35 is disposed on the connecting tube 31. Another end of the first spring 34 is disposed to abut against a stepped surface 321 formed inside the sleeve 32. The connecting tube 31 is provided with a conical hole 312. The conical hole 312 is disposed to correspond to the slot 311 and is connected with the slot 311. The steel ball 33 is disposed in the conical hole 312 and partially protrudes from an inner wall of the slot 311, and an annular protrusion 322 is provided on an inner side of the sleeve 32 and corresponds to the conical hole 312.

As illustrated in FIG. 1 through FIG. 5, in an embodiment, the trigger component 5 includes a sliding seat 51 and a second spring 52. The sliding seat 51 is slidably disposed on the housing 1 along an axial direction of the connecting tube 31. A positioning fork 511 is disposed on the sliding seat 51. An annular groove 323 is defined on an outer side of the sleeve 32, the positioning fork 511 is inserted into the annular groove 323. The second spring 52 is disposed along the axial direction of the connecting tube 31. An end of the second spring 52 abuts against the housing 1. Another end of the second spring 52 abuts against the sliding seat 51.

As illustrated in FIG. 1 through FIG. 5, in an embodiment, a bearing 6 is provided in the housing 1, an outer race of the bearing 6 is fixedly connected to the housing 1, and an inner race of the bearing 6 is fixedly connected to an outer periphery of the connecting tube 31 to circumferentially limit the connecting tube 31.

As illustrated in FIG. 1 through FIG. 5, in an embodiment, a controller 7 is disposed in the housing 1, a switch button 8 is disposed on the grip of the housing 1, the switch button 8 is connected to the controller 7, and the controller 7 is connected to the motor 2 and the battery module 4.

As illustrated in FIG. 1 through FIG. 5, in an embodiment, a battery slot 10 is disposed in the grip of the housing 1, the battery module 4 is detachably inserted into the battery slot 10, the housing 1 is provided with a snap-lock structure 9, and the snap-lock structure is configured to lock or unlock the battery module 4. It should be noted that, the snap-lock structure 9 is a conventional structure, and thus is not described herein.

Therefore, the disclosure has the following advantages.

The electric drill provided by the disclosure breaks the traditional appearance of electric drills in terms of aesthetics, featuring a futuristic and intelligent design. By using the housing to hide exposed rotating components in the related art, it reduces the possibility of long hair getting caught, or reduces the risk of accidental finger contact. Finally, quick-change of the drill bit is achieved by setting up the trigger component, making the electric drill convenient for non-professional users to operate and having a wide scope of applications.

The aforementioned embodiments merely illustrate the principle and efficacy of the disclosure, and are not used to limit the disclosure. Those skilled in the art can modify or change the aforementioned embodiments without departing from the spirit and scope of the disclosure. Therefore, all equivalent modifications or changes completed by those skilled in the art without departing from the spirit and technical concept disclosed by the disclosure shall still fall within the scope of protection claimed by the claims of the disclosure.

What is claimed is:

1. An electric drill, comprising a housing, wherein the housing is provided with a motor, a drill bit quick connector and a battery module therein; an end of the drill bit quick connector is drivingly connected to an output end of the motor, and another end of the drill bit quick connector is configured for detachable connection with an external drill bit; the battery module is detachably assembled in the housing and is configured to supply power to the motor; the drill bit quick connector is configured to lock the external drill bit in a docking state; and a trigger component is provided on the housing and configured to release a locked state between the drill bit quick connector and the external drill bit;

wherein the drill bit quick connector comprises a connecting tube, a sleeve, a steel ball and a first spring; a first end of the connecting tube is drivingly connected to the output end of the motor, an opposite second end of the connecting tube is disposed in an opening of the housing and defines a slot therein; the slot is configured for receiving an insertion end of the external drill bit; the sleeve is sleeved outside the connecting tube and disposed to correspond to the slot; an annular cavity is defined between the connecting tube and the sleeve; the first spring is sleeved on the connecting tube and located in the annular cavity, an end of the first spring is disposed to abut against a retaining ring, the retaining ring is disposed on the connecting tube and located in the annular cavity, another end of the first spring is disposed to abut against a stepped surface formed inside the sleeve; the stepped surface is located on a side of the retaining ring facing away from the first end of the connecting tube, the connecting tube is provided with a conical hole, the conical hole is disposed to correspond to the slot and is connected with the slot; the steel ball is disposed in the conical hole and partially protrudes from an inner wall of the slot, an annular protrusion is provided on an inner side of the sleeve and corresponds to the conical hole, and the annular protrusion is located between the retaining ring and the stepped surface;

wherein the trigger component comprises a sliding seat and a second spring; the sliding seat is slidably disposed on the housing along an axial direction of the connecting tube; a positioning fork is disposed on the sliding seat; an annular groove is defined on an outer side of the sleeve, the positioning fork is inserted into the annular groove; the second spring is disposed along the axial direction of the connecting tube; and an end of the second spring abuts against the housing; and another end of the second spring abuts against the sliding seat.

2. The electric drill as claimed in claim 1, wherein the housing is constituted as a gun-shaped structure; the motor and the drill bit quick connector are disposed in a barrel of the housing; the opening is provided at a muzzle of the housing; the another end of the drill bit quick connector facing away from the motor is disposed in the opening; and the battery module is detachably inserted into a grip of the housing.

3. The electric drill as claimed in claim 2, wherein a bearing is provided in the housing, an outer race of the bearing is fixedly connected to the housing, and an inner race of the bearing is fixedly connected to an outer periphery of the connecting tube.

4. The electric drill as claimed in claim 1, wherein a controller is disposed in the housing, a switch button is disposed on a grip of the housing, the switch button is connected to the controller, and the controller is connected to the motor and the battery module.

5. The electric drill as claimed in claim 1, wherein a battery slot is disposed in a grip of the housing, the battery module is detachably inserted into the battery slot, and the housing is provided with a snap-lock structure, and the snap-lock structure is configured to lock or unlock the battery module.

* * * * *